United States Patent
Bender

(10) Patent No.: US 6,736,165 B2
(45) Date of Patent: May 18, 2004

(54) VALVE DEVICE AND DISTRIBUTOR DEVICE

(75) Inventor: Steffen Bender, Herborn (DE)

(73) Assignee: Reich KG (DE)

( * ) Notice: Subject to any disclaimer, the term of this patent is extended or adjusted under 35 U.S.C. 154(b) by 29 days.

(21) Appl. No.: 10/194,416

(22) Filed: Jul. 12, 2002

(65) Prior Publication Data

US 2003/0015245 A1 Jan. 23, 2003

(30) Foreign Application Priority Data

Jul. 13, 2001 (DE) ...................... 201 11 656 U

(51) Int. Cl.⁷ .............................................. F16K 11/10
(52) U.S. Cl. ......................................................... 137/883
(58) Field of Search ................ 137/625.3; 116/273; 73/861.71; 237/59, 69; 251/208

(56) References Cited

U.S. PATENT DOCUMENTS 4,360,040 A * 11/1982 Cove et al. .............. 137/625.3
6,089,263 A * 7/2000 Dumser ..................... 137/552

FOREIGN PATENT DOCUMENTS

| CH | 688 834 A5 | 4/1998 | ......... F16K/11/044 |
|----|----|----|----|
| DE | 196 08 780 A1 | 9/1996 | ......... F16K/11/04 |
| DE | 298 04 151 U1 | 8/1999 | ......... F16L/41/04 |
| DE | 298 06 215 U1 | 9/1999 | ......... F24D/19/10 |
| DE | 299 05 655 U1 | 9/1999 | ............. G01F/1/20 |
| EP | 0797 080 A2 | 9/1997 | ......... G01F/15/00 |
| EP | 0 789 821 B1 | 1/2001 | ............. F16K/3/26 |

* cited by examiner

*Primary Examiner*—John Fox
(74) *Attorney, Agent, or Firm*—Womble Carlyle Sandridge & Rice, PLLC

(57) ABSTRACT

The present invention relates to a valve device for flow control in a distributor of a liquid-operated heat or cold energy supply system with a flow measuring unit to measure a flow rate of the liquid and with a control element to adjust a flow area for the liquid, the maximum flow area being variable by rotation of the control element, the control element being designed as a first disc with at least one flow limiting aperture and being part of a control unit, and the control unit comprising a second disc which exhibits at least one flow aperture, is arranged in parallel to the first disc and adjoins said first disc, forming a tight connection, the at least one flow limiting aperture and the at least one flow aperture being positioned such that a total area made up of the areas of the at least one flow aperture and the at least one flow limiting aperture, which overlap each other, is variable as a function of a rotation of the first disc relative to the second disc around a rotational axis.

21 Claims, 3 Drawing Sheets

VALVE DEVICE AND DISTRIBUTOR DEVICE

BACKGROUND OF THE INVENTION

The present invention relates to a valve device for flow control in a distributor of a liquid-operated heat or cold energy supply system with a flow measuring unit to measure a flow rate of the liquid and with a control element to adjust a flow area for the liquid, the flow area being variable by rotation of the control element. The invention also relates to a distributor device with at least one such valve device.

A distributor device is generally used to share out, in an adjustable or regulatable way, a circulating heating or cooling medium in a heat or cold energy supply system to local individual heating or cooling points. One example of such a heat supply system is an underfloor heating system comprised of several heating circuits, which are branched off from a collective heating system via a plurality of adjustment and control elements. Distributor devices used may be pipe sections exhibiting branch lines for the flows and returns of the individual heating circuits. Since the individual heating circuits of an underfloor heating system may be sized differently to account for the different room floor areas, the heating circuits for the individual rooms have to be controllable separate from each other. It is therefore usual practice to provide, particularly in the return line, in addition to the standard control valves, which are controlled manually, by means of an electric actuator or by a thermostat, so-called flow rate limiters through which the flow rate can be adjusted for each heating circuit. The flow rate can then be determined by means of valve devices employed in the flow line, which are equipped with a corresponding flow measuring unit.

The German utility model G 299 05 655 teaches a generic valve device that exhibits such a flow measuring unit. The valve device described in said publication comprises an outer pipe jacket and an inner pipe arranged inside said pipe jacket, the diameter of said inner pipe being sized such that a void is formed between the outer surface of the inner pipe and the inner surface of the pipe jacket. The liquid enters the void via a first end of the inner pipe, flows through the inner pipe, reaches the void through the other end of the inner pipe, and then exits the void. The flow measuring unit is realised by a float, which is movably arranged inside the inner pipe, and a pressure spring, which is arranged right against the float and which exerts a spring force contrary to the direction of flow of the liquid. The float may be connected with a pointer of an indication device to indicate the measured flow rate. Moreover, it can itself indicate the flow rate, particularly if the internal pipe and the external pipe jacket are at least partially designed transparently. Apart from the flow measuring unit there is an adjustment spindle which protrudes into the inner pipe. By rotating a rotating handle the adjustment spindle can be moved upwards and downwards in parallel to the course of the inner pipe, and the exiting of the liquid from the inner pipe can be controlled by adjusting the flow area. In this way the adjustment spindle tightens off the inner pipe in a "closed position" in collaboration with a sealing ring, the result being that the liquid cannot exit the inner pipe. If the adjustment spindle is move upwards form this position, an "open position" is reached, which guarantees a certain flow area for the liquid as a function of the adjustment spindle position. Although both the function of a flow measurer and that of a flow rate limiter are realised through this valve device, the valve device exhibits several disadvantages. It is relatively large and therefore occupies rather a lot of space. Said space is required above all by the adjustment spindle and the elements co-acting with said adjustment spindle. Moreover, this kind of flow rate limiting does not allow an exact fine controlling of the flow area, which is desired in numerous areas of application.

SUMMARY OF THE INVENTON

The invention is therefore based on the object of developing the generic valve device in such a way that a flow area for the liquid is exactly adjustable and finely controllable and that a smaller valve size becomes possible. Moreover, it is the object of the invention to provide a distributor device exhibiting at least one such valve device.

Said object is achieved by a generic valve device, on which the control element is designed as a first disc with at least one flow limiting aperture and is part of a control unit, the control unit comprising a second disc which exhibits at least one flow aperture, is arranged in parallel to the first disc and adjoins said first disc, forming a tight connection. The at least one flow limiting aperture and the at least one flow aperture are positioned such that a total area made up of the areas of the at least one flow aperture and the at least one flow limiting aperture, which overlap each other, is variable as a function of a rotation of the first disc relative to the second disc around a rotational axis. The arrangement of the at least one flow limiting aperture and the at least one flow aperture can be adjusted individually to the special needs, so that an optimum adjustment of the flow area for the liquid can be reached. The possibility or fine regulation is thus guaranteed. Moreover, the arrangement of the apertures can be selected such that no flow is possible in a certain rotating position. In this way the control unit may be used to shut off a branch line in the distributor. The valve device according to the present invention can also be designed in a space-saving way because the arrangement of the two discs requires only little room. Owing to their shape, the first disc and the second disc are very lightweight and therefore economically producible, with ceramics or brass as a material also being available apart from plastic. Particularly the use of ceramics gives high-quality seals.

In a first especially preferred embodiment of the invention it is envisaged that the at least one flow limiting aperture and the at lest one flow aperture are designed such that by the rotation of the first disc relative to the second disc around the rotational axis a linear increase of the flow area is achievable. In this case the adjustment of the flow area is particularly comfortable so that it can also be executed by a less experienced operator or technician.

Particularly economical is also an embodiment of the invention, for which the at least one flow limiting aperture and/or the at least one flow aperture comprises an aperture extending concentrically with respect to the rotational axis.

Particularly when either a flow limiting aperture or a flow aperture is designed as an aperture extending concentrically with respect to the rotational axis, said concentrically extending aperture can narrow so that, depending on the rotation position of the first disc, the flow area is in the one case bigger and in the other case smaller. This way, a linear increase of the flow area can also be obtained particularly easily when rotating the first disc relative to the second disc around the rotational axis.

Alternatively or additionally, the at least one flow limiting aperture and/or the at least one flow aperture can also comprise several circular apertures of different sizes. Any other shape is also conceivable.

An embodiment of the invention envisages that the control unit comprises a rotating handle connected to the first disc in such a way that the first disc is rotatable by rotation of the rotating handle relative to the second disc, it being particularly possible for the rotating handle to be connected to the first disc via a rotatably arranged pipe. The rotating handle guarantees a comfortable and easy operation of the control unit.

In a particularly advantageous embodiment of the invention, the pipe is designed as consisting of at least two parts, the individual parts being connectable by a screwing mechanism and/or a plugging mechanism. This embodiment makes it possible, for example, to insert a first part of the pipe into a first aperture of a distributor, while the second part of the pipe is inserted into a second aperture of the distributor which lies opposite to the first. The connection of the two parts then occurs inside the distributor by way of a screwing mechanism or a plugging mechanism. Apart form this, other connection mechanisms are also realisable for the expert.

The pipe can exhibit a first aperture through which the liquid can flow into the pipe, and a second aperture through with the liquid can flow out of the pipe. This means that in the present case the pipe not only serves to transfer the motion from the rotating handle to the disc but also exercises a second function, namely that of carrying liquid.

An especially successful embodiment of the invention envisages that the first disc is arranged at the first or the second aperture of the pipe. The first disc is advantageously connected tightly with the pipe. The second disc may then be arranged inside the pipe or outside the pipe in parallel to the first disc. In order to allow a rotating motion of the first disc relative to the second disc, only an appropriate anchoring of the second disc is necessary.

The flow measuring unit can advantageously exhibit a measurement body which is arranged movably in the pipe, or a further pipe through which the liquid flows, an embodiment of the invention envisaging that the measurement body is connected to a spring element which exerts a spring force against a direction of low of the liquid inside the pipe or the further pipe. The spring element can for example be a pressure spring. Like the measurement body it can be arranged in the pipe or the further pipe.

It is particularly advantageous if the measurement body is connected to the spring element via a rod. In this case, the measurement body and the spring element can be positioned at a relatively long distance from each other, which is particularly sensible if the spring element, in addition to its original function, also executes an indication function, for which it has to be arranged in a position that can be designed such that it can be easily seen.

The rod and/or the spring element can be arranged inside the pipe or the further pipe.

The spring element or the rod or the measurement body can be connected to a pointer of an indication unit to indicate the flow rate, or can themselves indicate the flow rate, particularly if the pipe or the further pipe is at least partially designed transparently, the spring element and the rod offering the special advantage that they can be positioned clearly visible, because an arrangement on which the rod and/or the spring element protrudes at least partially from the actual distributor itself, for example, is also possible.

The valve device can comprise a temperature measurement and indication unit, it being possible that the temperature measurement and indication unit is at least partially arranged in the pipe or the further pipe.

The aforementioned object is also achieved by a distributor device for sharing out a liquid into several circuits in a heat or cold energy supply system, which is operated with said liquid, having at least one valve device according to the present invention. Said distributor device can exhibit at least one flow distributor pipe with flow branch lines and at least one return distributor pipe with return branch lines, the liquid being dischargeable through the flow distributor pipe via the flow branch lines and returnable into the return distributor via the return branch lines, the at least one valve device being arranged as a flow line valve in the flow distributor pipe. Apart form this especially advantageous embodiment, the at least one valve device can also be arranged as a return line valve in the return distributor pipe.

Other objects, features and advantages of the present invention will be understood by reference to and understanding of the following description with reference to the attached drawings.

BRIEF DESCRIPTION OF THE DRAWINGS

Further details, features and advantages of the invention are given in the embodiments described in the following, with reference being made to the drawings attached, which show.

DESCRIPTION OF THE PREFERRED EMBODIMENT

In the figures, the same or similar components have the same reference numbers.

Figure 1:
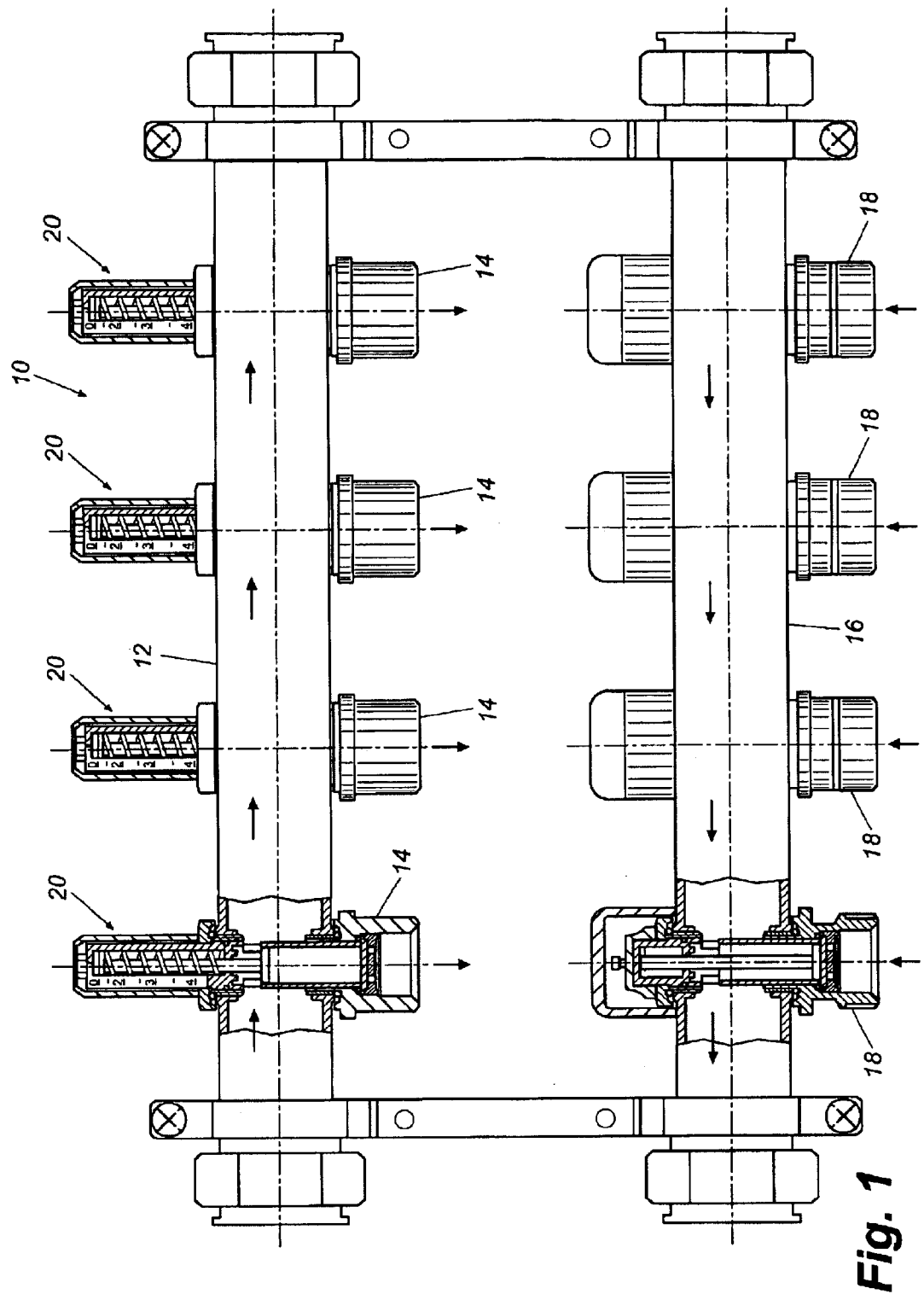
FIG. 1 an embodiment, shown schematically and partially cut, of the distributor device according to the present invention.

FIG. 1 shows a partially cut schematic representation of an embodiment of the distributor device 10 according to the present invention. The distributor device 10 serves to divide a liquid into individual circuits of a heat or cold energy supply system. This can, for example, be a hot water heating system, a solar system or the like. The distributor device 10 comprises a flow distributor pipe 12 having flow branch lines 14, and a return distributor pipe 16 having return branch lines 18. The liquid to be distributed leaves the flow distributor pipe 12 through the flow distributor branch lines 14 and returns via the individual circuits through the return branch lines 18 back into the return distributor pipe 16. In the flow distributor pipe 12, valve devices 20 according to the present invention are arranged. By means of such a valve device 20 according to the present invention, it is possible, on the one hand, to measure the flow rate of the liquid, and, on the other, to vary the flow area through which the liquid flows at the transition from the flow distributor pipe 12 into the flow branch line 14. An embodiment of the valve device 20 according to the present invention is described in the following on the basis of FIG. 2.

Figure 2:
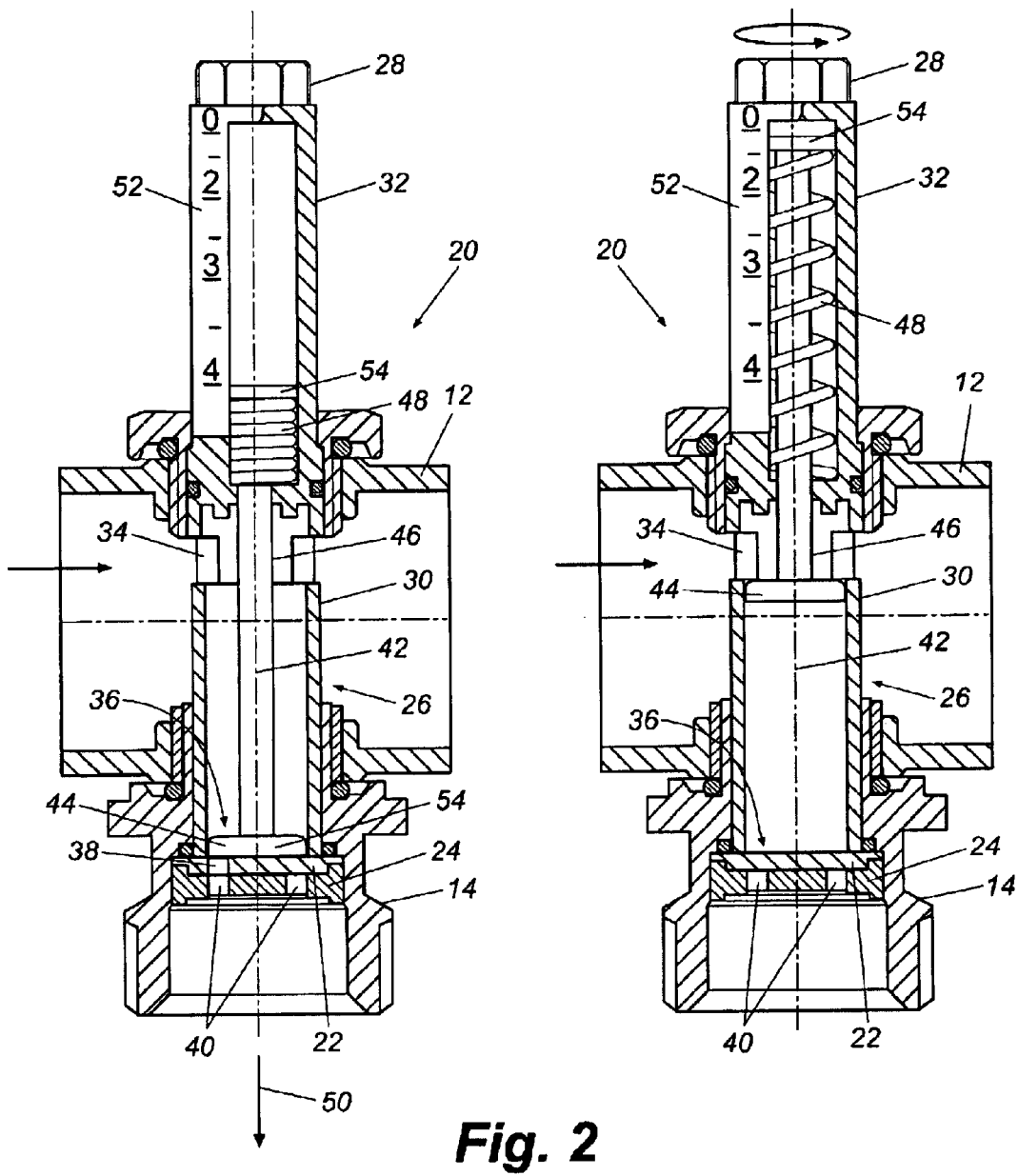
FIG. 2 an embodiment, shown schematically and cut, of the valve device according to the present invention, in two different positions.

In FIG. 2 said embodiment of the valve device 20 according to the present invention is shown cut in two different states. The valve device 20 represented on the left is in a state in which the transition between the flow distributor pipe 12 and the flow branch line 14 is open. Whether there is an open, a closed or a partially open state depends on the operating position of a control unit of the valve device 20. Said control unit comprises a first disc 22 and a second disc 24, the first disc 22 being arranged in parallel to the second disc 24, forming a tight connection. Moreover, the first disc 22 has a bearing designed such that it can be moved by a rotation relative to the second disc 24. In the embodiment shown in FIG. 2, this has been realised by having the second disc 24 anchored on the flow branch line 14, while the first disc 22 is connected to a rotating handle 28 via a pipe 26. In the embodiment shown, the pipe 26 consists of two parts 30 and 32, the pipe part 30 being largely arranged inside the flow distributor pipe 12, while pipe part 32 is mainly arranged outside said flow distributor pipe 12. The two pipe parts 30 and 32 are connected with each other in such a way that the movement of pipe part 32 caused by rotating the rotating handle 28 is transferable onto pipe part 30 and hence also onto the first disc 22. Such a connection can, for example, be realised through a screwing mechanism or a plugging mechanism. The pipe 26 exhibits a first aperture 34, through which the liquid can flow into the pipe 26. For stabilising purposes, the first aperture 34 can also be interrupted by struts. For liquid outflow, a second aperture 36 is provided, at which the first disc 22 is arranged. The first disc 22 exhibits at least one flow limiting aperture 38, and the second disc 24 is characterized by the arrangement of at least one flow aperture 40, the at least one flow limiting aperture 38 and the at least one flow aperture 40 being positioned such that a total area made up of the areas of the at least one flow aperture 40 and the at least one flow limiting aperture 38, which overlap each other, is variable as a function of a rotation of the first disc 22 relative to the second disc 24 around a rotational axis 42. In the operating position shown on the left-hand side of FIG. 2, at least one flow limiting aperture 38 is directly arranged above a flow aperture 40, so that the liquid can flow out of pipe 26 into the flow branch line 14. With the valve device 20 according to the present invention, the flow area for the liquid is thus variable. With a corresponding design of the first disc 22 and the second disc 24, a possibility of fine regulation is guaranteed. In addition, however, the valve device 20 according to the present invention also exhibits a flow measuring unit for measuring a flow rate of the liquid, which is described in the following initially also on the basis of the left representation in FIG. 2. The flow measuring unit comprises a measurement body 44, which is positioned movably inside the pipe 26 and designed in a plate shape in the embodiment shown. Whilst this is a particularly suitable shape, other developments are also conceivable for the expert. The measurement body 44 is connected to a spring element 48 via a rod 46, the spring element 48 exerting a spring force against the direction of flow 50 of the liquid and is arranged inside the pipe part 32. Owing to the partially transparent design of the pipe area, in which the spring element 48 is situated, said spring element is visible from the outside. Around the transparent area, a scale 52 is provided, which serves to read the relevant flow rate. The top section 54 of the rod 46, which adjoins the spring element 48 and which transmits the force from the measurement body 44 onto said spring element, represents a kind of pointer, which indicates the relevant flow rate on the scale 52. Since in the example shown on the left in FIG. 2, the transition between the flow distributor pipe 12 and the flow branch line 14 is open, the measurement body 44 is pressed downwards by the liquid flow in the direction of the flow 50. Owing to this movement the rod 46 and hence also section 54 of the rod 46 is shifted against the spring force of the spring element 48. As a result of this action, a flow rate 4 of a defined unit is indicated on the scale 52 through the section 54 of the rod 46. If the valve device 20 according to the present invention is developed accordingly, the spring element 48 or the measurement body 44, too, can serve as a pointer. Contrary to the embodiment shown in FIG. 2, the valve device 20 according to the present invention can also comprise a temperature measurement and indication unit, which is preferably positioned in the pipe part 32 and can thus be read together with the flow rate.

On the right-hand side of FIG. 2 the valve device 20 is shown in a position in which the flow branch line 14 is shut off. This shutoff is a result of the rotation of the first disc 22 relative to the second disc 24 with the aid of the rotating handle 28 into a position in which the at least one flow limiting aperture 38 of the first disc 22 does not coincide with the at least one flow aperture 40 of the second disc 24. As the liquid is not flowing through the pipe 26, the measurement body 44 is not pressed down either, and there is no deformation force acting on the spring element 48. Hence, section 54 of the rod 46 shows a zero flow rate on the scale 52.

Figure 3:
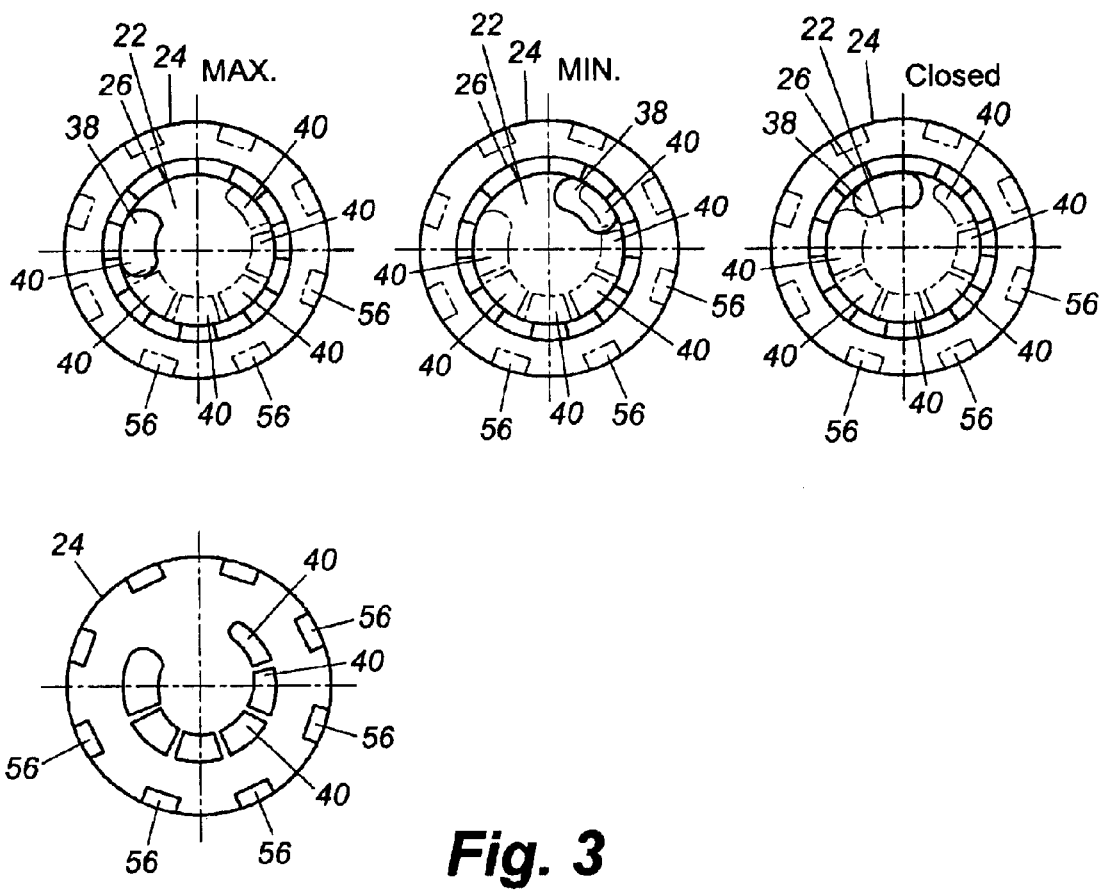
FIG. 3 a view from the top, shown schematically and partially cut, onto a first disc in three different positions, and a view from the top, shown schematically, onto a second disc of an embodiment of the valve device according to the present invention.

FIG. 3 shows a top view onto the first disc 22 in three different positions. The flow limiting aperture 38 of the first disc 22 is represented by a continuous line, while the flow apertures 40 of the second disc 24, which are located below the first disc 22, are represented by broken lines. The outer apertures 56 of the second disc 24 only serve to anchor the second disc 24 inside the flow branch line 14. Moreover, in the top view onto the first disc 22, a cross-section of the pipe 26 can be seen. A top view onto the unchanging position of the second disc 24 is shown in the bottom part of FIG. 3. The flow apertures 40 are arranged concentrically and with and increasing size in the clockwise direction.

In a first position of the first disc 22, shown on the left-hand side in FIG. 3, at the top, the flow limiting aperture 38 of the first disc 22 is located directly over the larger flow aperture 40 of the second disc 24, so that the flow area for the liquid reaches a maximum value. Next to this on the right the figure shows a position in which the flow limiting aperture 38 of the first disc 22 is located directly over the smallest flow aperture 40 of the second disc 24. The flow area for the liquid is thus at its minimum. In the third position shown, the flow limiting aperture 38 of the first disc 22 is located over an area of the second disc 24, which exhibits no flow aperture 40, the result being that a shutoff is realised. Of course, the shapes of the flow apertures 40 and the flow limiting aperture 38 are not limited to those shown. Instead, almost all geometric shapes such as triangles, rectangles, etc. are conceivable. Moreover, the flow apertures 40 do not necessarily have to increase concentrically in the sequence of their size. What is essential is that the first disc 22 and the second disc 24 are selected with respect to reach other in such a way that the intended control can be realised. Hence, it is also possible, for example, to provide several flow limiting apertures 38 in the first disc 22, while only one flow aperture 40 is provided in the second disc 24. Likewise, several flow limiting apertures 38 can be provided in the first disc 22 and several flow apertures 40 in the second disc 24. The discs 22 and 24 are preferably designed flat and can be made e.g. of ceramics, plastic or brass. Particularly economical is the use of plastic for the fabrication.

Figure 4:
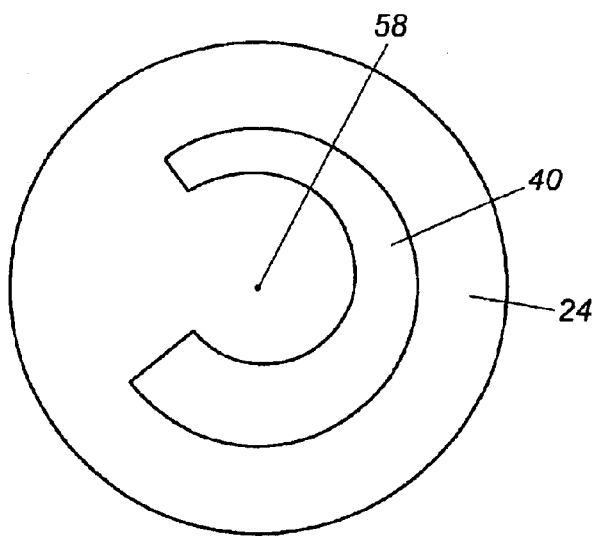
FIG. 4 a view from the top, shown schematically, onto a second disc of a further embodiment of the valve device according to the present invention.

FIG. 4 is a schematic representation of a top view onto an alternative embodiment of the second disc 24. In this embodiment a flow aperture 40 is provided which extends concentrically with respect to a centre 58 of the second disc 24. At the same time, said flow aperture 40 narrows. If such narrowing is not envisaged, it is sensible to also fit the first disc 22 with a concentrically extending flow limiting aperture 38. If the extension angle is chosen accordingly, the flow area can be varied very well also in this way.

Those skilled in the art will appreciate that modifications to the exemplary embodiments of the present invention are possible without departing from the spirit and scope of the present invention. Accordingly, the foregoing description of the exemplary embodiments is provided for the purpose of illustrating principles of the present invention and not in limitation thereof, since the spirit and scope of the present invention is ultimately defined by the claims.

What is claimed is:

1. Valve device for flow control in a distributor of a liquid-operated heat and cold energy supply system having a flow measuring unit to measure a flow rate of the liquid and having a control element to adjust a flow area for the liquid, the maximum flow area being variable through the rotation of the control element, characterized in that the control element is designed as a first disc with at least one flow limiting aperture, and is part of a control unit, the control unit comprising a second disc, which exhibits at least one flow aperture, is arranged in parallel to the first disc and adjoins said first disc, forming a tight connection, the at least one flow limiting aperture and the at least one flow aperture being positioned such that a total area made up of the areas of the at least one flow aperture and the at least one flow limiting aperture, which overlap each other, is variable as a function of a rotation of the first disc relative to the second disc around a rotational axis.

2. Valve device according to claim 1, characterized in that the at least one flow limiting aperture and the at least one flow aperture are designed such that a linear increase of the flow area can be achieved by rotating the first disc relative to the second disc around the rotational axis.

3. Valve device according to claim 1, characterized in that the at least one flow limiting aperture and/or the at least one flow aperture comprises an aperture extending concentrically with respect to the rotational axis.

4. Valve device according to claim 3, characterized in that the aperture (38; 40) narrows.

5. Valve device according to claim 1, characterized in that the at least one flow limiting aperture and/or the at least one flow aperture comprises several circular apertures of different sizes.

6. Valve device according to claim 1, characterized in that, the control unit comprises a rotating handle connected to the first disc in such a way that the first disc is rotatable relative to the second disc by way of a rotation of the rotating handles.

7. Valve device according to claim 6, characterized in that the rotating handle is connected to the first disc via a rotatably arranged pipe.

8. Valve device according to one of claims 7, characterized in that the pipe exhibits a first aperture through which the liquid can flow into the pipe, and that the pipe exhibits a second aperture through which the liquid can flow out of the pipe.

9. Valve device according to claim 8, characterized in that the first disc is arranged at the first or the second aperture of the pipe.

10. Valve device according to claim 7, characterized in that the pipe is designed to comprise a minimum of two parts, the individual parts (30, 32) being connectable by a screwing mechanism and/or by a plugging mechanism.

11. Valve device according to one of claims 10, characterized in that the pipe exhibits a first aperture through which the liquid can flow into the pipe, and that the pipe exhibits a second aperture through which the liquid can flow out of the pipe.

12. Valve device according to claim 11, characterized in that the first disc is arranged at the first or the second aperture of the pipe.

13. Valve device according to claim 1, characterized in that the flow measuring unit exhibits a measurement body, which is arranged movably in the pipe or a further pipe through which the liquid flows.

14. Valve device according to claim 13, characterized in that the measurement body is connected to a spring element that exerts a spring force against a direction of flow of the liquid inside the pipe or a further pipe.

15. Valve device according to one of claims 14, characterized in that the rod and/or the spring element is arranged inside the pipe or a further pipe.

16. Valve device according to claim 14, characterized in that the measurement body is connected to the spring element via a rod.

17. Valve device according to one of claims 16, characterized in that the rod and/or the spring element is arranged inside the pipe or a further pipe.

18. Valve device according to claim 13, characterized in that the spring element or the rod or the measurement body are connected to a pointer of an indication unit to indicate the flow rate, or itself indicates the flow rate, particularly if the pipe or the further pipe is at least partially designed transparently.

19. Valve device according to claim 7, characterized in that the valve device comprises a temperature measurement and indication unit, the temperature measurement and indication unit being arranged at least partially in the pipe or the further pipe.

20. A distributor device to divide a liquid into several circuits in a heat or cold energy supply system operated with said liquid, said distributor device comprising at least one flow distributor pipe and at least one valve device associated with said at least one flow distributor pipe, said at least one valve device comprising:

a flow measuring unit to measure a flow rate of the liquid; and a control element to adjust a flow area for the liquid, the maximum flow area being variable through the rotation of the control element, said control element being designed as a first disc with at least one flow limiting aperture, and being part of a control unit, said control unit comprising a second disc, which exhibits at least one flow aperture, and said control unit being arranged in parallel to said first disc and adjoining said first disc, forming a tight connection, said at least one flow limiting aperture and said at least one flow aperture being positioned such that a total area made up of the areas of said at least one flow aperture and said at least one flow limiting aperture, which over-lap each other, is variable as a function of a rotation of said first disc relative to said second disc around a rotational axis.

21. Distributor device according to claim 20, and said distributor device further including flow branch lines associated with said at least one distributor pipe, at least one return distributor pipe, and return branch lines associated with said return distributor pipe, whereby the liquid is dischargeable through the flow distributor pipe via the flow branch lines and returnable into the return distributor pipe via the return branch lines, said at least one valve device being arranged as a flow line valve in the flow distributor pipe.

* * * * *